Aug. 13, 1968  R. W. KENNY  3,396,820
FOOD CONVEYING APPARATUS FOR AIRCRAFT
Filed June 6, 1966  5 Sheets-Sheet 1
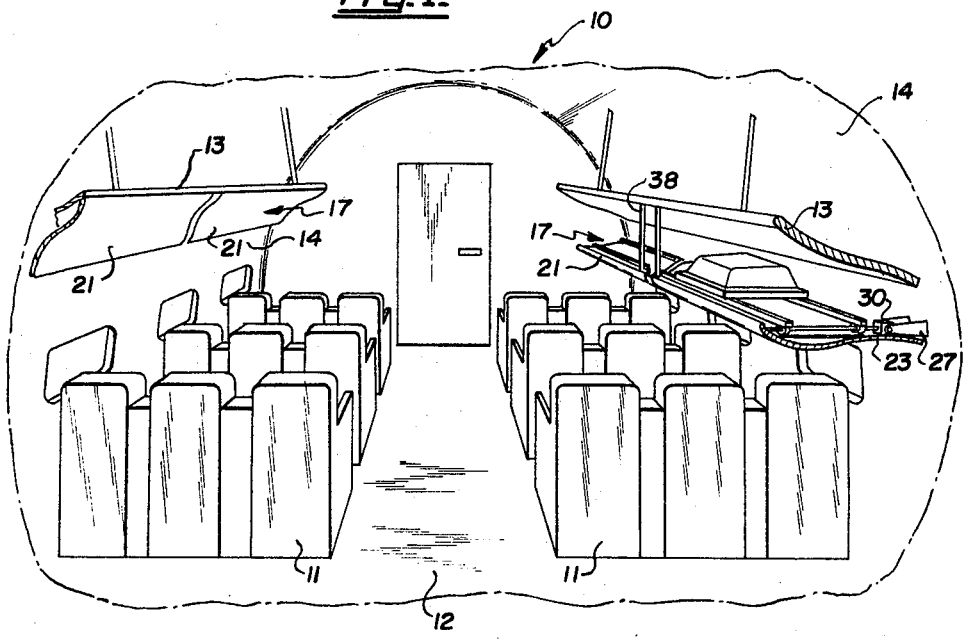
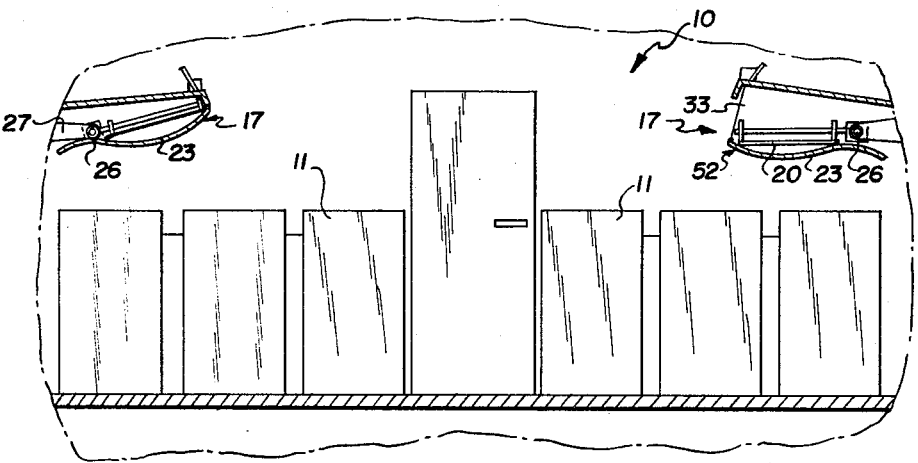
INVENTOR
RONALD W. KENNY
BY
Fetherstonhaugh & Co.
ATTORNEYS

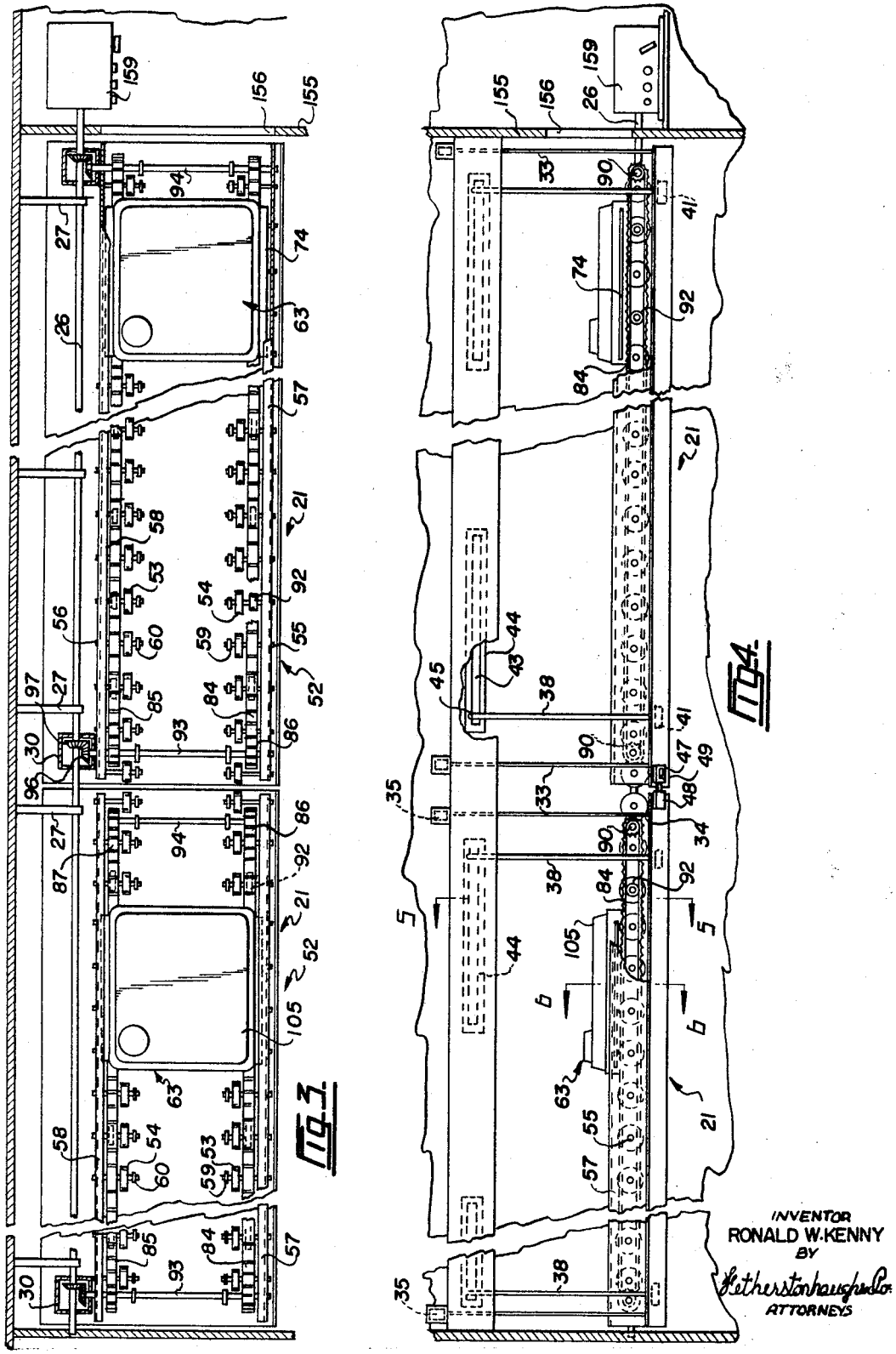

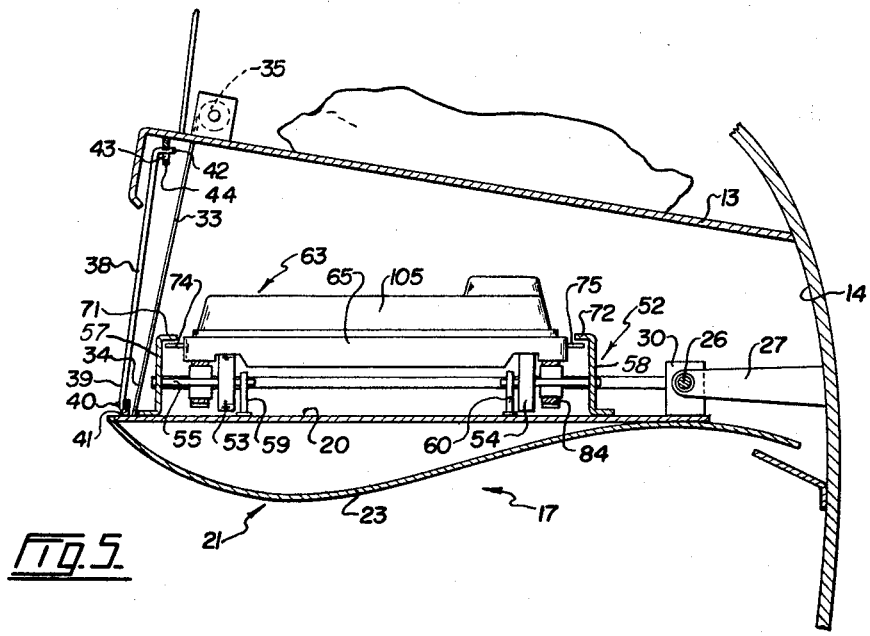
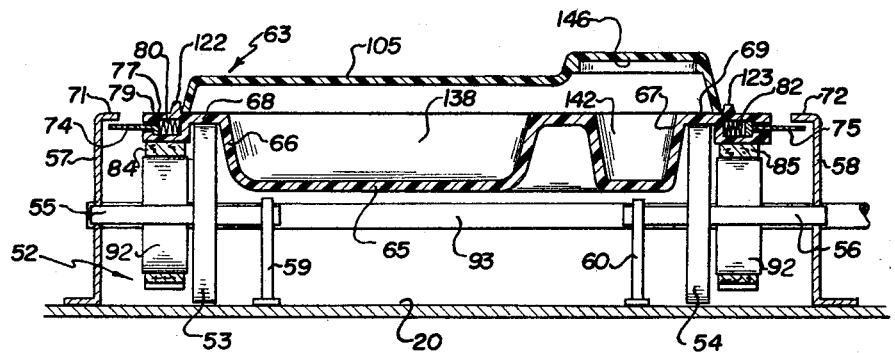

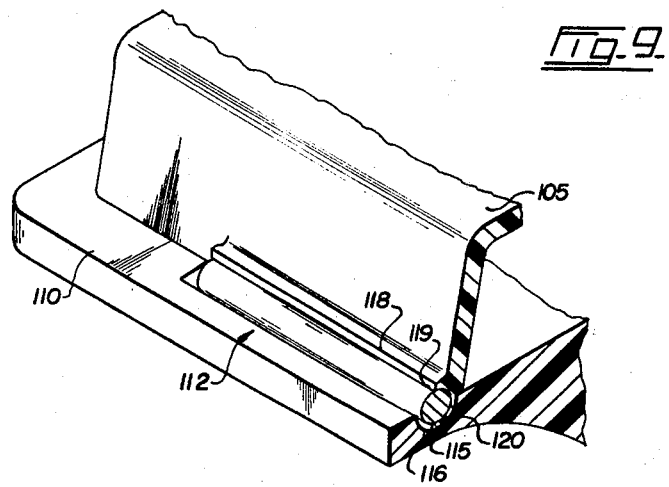
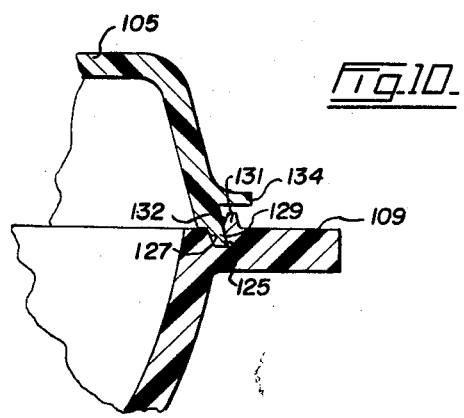
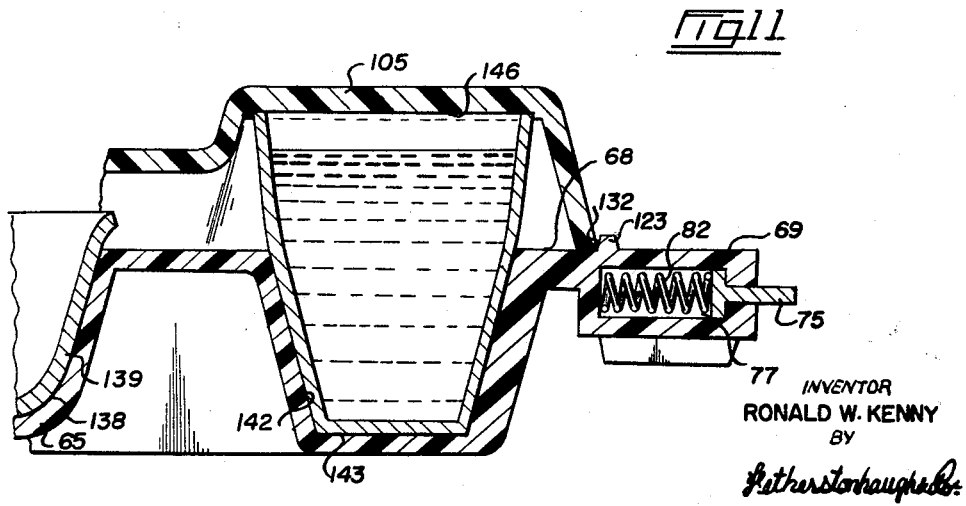

United States Patent Office 3,396,820
Patented Aug. 13, 1968

3,396,820
FOOD CONVEYING APPARATUS FOR AIRCRAFT
Ronald W. Kenny, 635 Southborough, West
Vancouver, British Columbia, Canada
Filed June 6, 1966, Ser. No. 555,396
18 Claims. (Cl. 186—1)

ABSTRACT OF THE DISCLOSURE

The conveying apparatus is designed to be placed in an aircraft where it is not in the way of passengers getting into and out of their seats, or persons using the aisle of the craft; and the apparatus includes track means for moving trays therealong, and means for releasably retaining the trays on the track means without danger of the trays being accidentally displaced therefrom.

Figure 7:
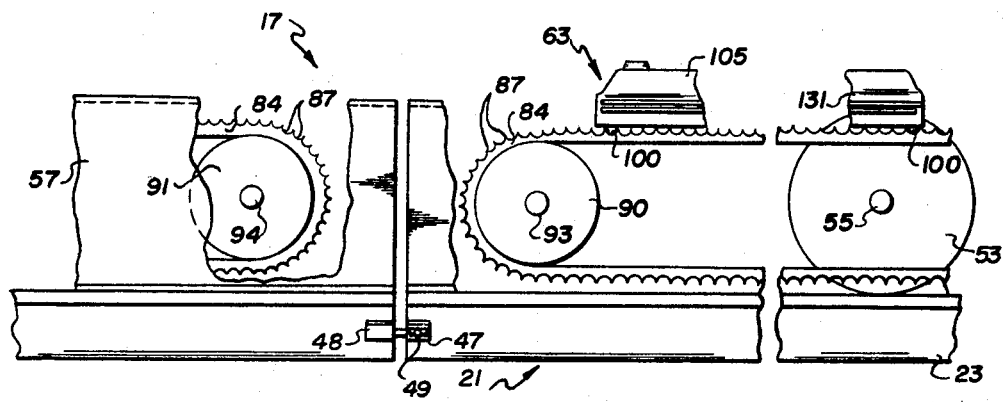

This invention relates to apparatus for conveying food or meals within aircraft.

As aircraft get larger, and non-stop flights get longer, the problem of feeding the passengers in flight has increased. Of necessity, everything in an aircraft cabin has to be compact, there must be very little waste space. The passengers are seated in rows of seats on opposite sides of a narrow central aisle. At the present time, when it is necessary to serve a meal, two or three stewardesses and/or stewards bring the prepared meals on trays along the narrow aisle to the passengers. This and the clearing away of the dirty dishes is a long and frustrating task, particularly if the aircraft encounters turbulent air during this time. Single cabins now accommodate one hundred or more passengers, and it takes considerable time to attend to them. With the speed and distances involved today, it is sometimes necessary to serve a meal and to clear up in from 60 to 90 minutes. This makes the task of the attendants very difficult.

Some effort has been made in the past to provide food conveying apparatus for aircraft, but these evidently have not been successful since they do not appear to be in use. In one prior system, a cabinet which carries food trays is moved along the aisle of the aircraft cabin. This cabinet is either supported from the floor by a movable stand or is suspended from a carriage arrangement near the cabin ceiling. Equipment of this type is awkward and cumbersome, and would make it difficult for more than one person at a time to serve the passengers.

In another prior system, tracks extend along the ceiling of the cabin on opposite sides of the aisle. A carriage travels on each set of rails, and a cabinet is suspended from the carriage, said cabinet being designed to carry several food trays. The cabinet hangs over the heads of passengers, with the danger of a person being struck by it if the person stands up at the wrong time. Furthermore, the cabinet has to be shifted laterally relative to the carriage when it is desired to remove trays therefrom. This equipment is relatively heavy and cumbersome.

The present invention overcomes these difficulties by providing food conveying apparatus so designed that it can form part of the parcel or coat rack which is provided in aircraft cabins and extends longitudinally along the side wall thereof spaced above the heads of the passengers. When the conveying apparatus is not in use, it is folded completely out of the way, and when it is required, it is easily swung to operative position. The apparatus includes track means and trays adapted to travel therealong. Co-operating and releasable retaining means are provided along the track means and on each tray for retaining the latter on said track means while permitting the tray to travel therealong. The arrangement is such that when a tray is moving along the track means, it cannot be accidentally touched by the passenger rising out of his seat. In the preferred form of the invention, each tray is provided with a cover that prevents any spillage of liquids or food while the tray moves along the track means. It is preferable to provide power means along the track means and engageable with each tray to move the latter along the former.

With this arrangement, the trays as they are made up are placed on the track means at each side of the cabin, and the trays are moved longitudinally of the cabin. With this arrangement, a single stewardess can release the trays from the rack means and place them in front of the individual passengers.

Figure 8:
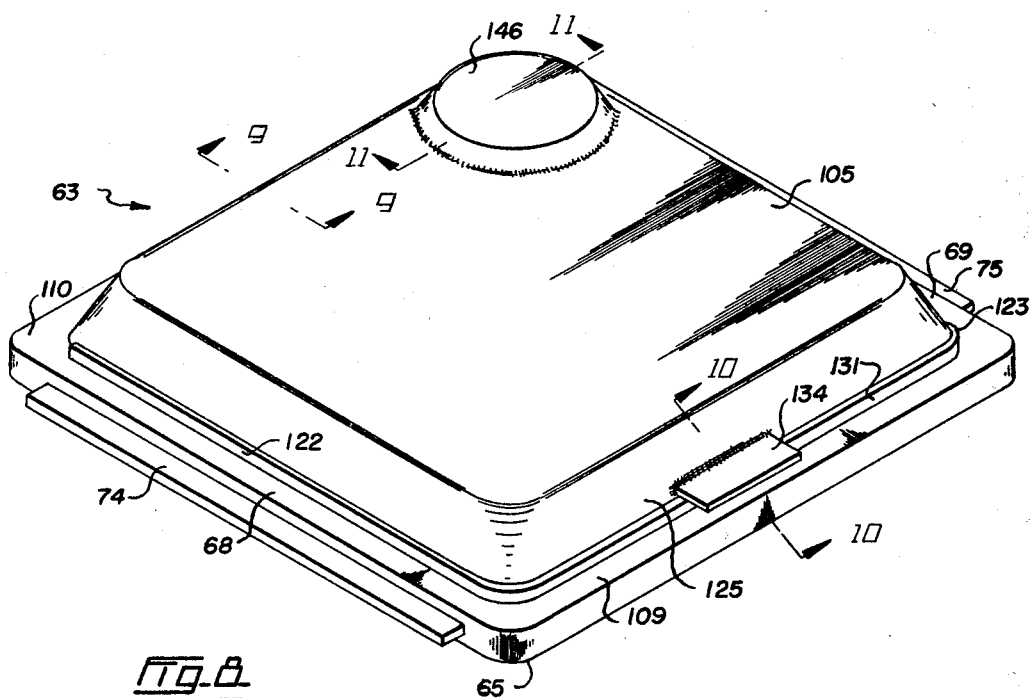

An example of the present invention is illustrated in the accompanying drawings, in which:

FIGURE 1 is a diagrammatic perspective view of the interior of an aircraft, illustrating conveying apparatus in accordance with this invention along opposite sides thereof, the apparatus on one side being open and in operation, and the apparatus on the other side being closed, FIGURE 2 is a vertical cross section through the cabin illustrated in FIGURE 1, FIGURE 3 is a plan view of the food conveying apparatus, FIGURE 4 is a side elevation of the apparatus of FIGURE 3, FIGURE 5 is an enlarged section taken on the line 5—5 of FIGURE 4, FIGURE 6 is an enlarged cross section taken on the line 6—6 of FIGURE 4, FIGURE 7 is an enlarged fragmentary side elevation of a tray in the conveying apparatus, FIGURE 8 is an enlarged perspective view of a preferred form of tray for use in this conveying apparatus, FIGURE 9 is an enlarged fragmentary perspective view, partly in section, of a hinge arrangement in the tray of FIGURE 8, FIGURE 10 is a fragmentary section taken on the line 10—10 of FIGURE 8, and FIGURE 11 is a fragmentary section taken on the line 11—11 of FIGURE 8.

Referring to the drawings, FIGURES 1 and 2 diagrammatically illustrate a portion of a passenger cabin 10 of an aircraft having rows of seats 11 extending along opposite sides of a central aisle 12 extending longitudinally of the cabin. A package or coat rack 13 extends along each side wall 14 of the cabin spaced far enough above seats 11 that a passenger can rise out of the seats without striking the rack. These racks are standard equipment in passenger aircraft. Food conveying apparatus 17 according to this invention is provided along each side wall 14 above seats 11. In the preferred form of the invention, this conveying apparatus forms part of rack 13, although it does not have to. The conveying apparatus when not in use merely makes rack 13 a little thicker than it normally would be, although these racks are usually made hollow in order to lighten them while retaining sufficient strength for supporting articles thereon.

Conveying apparatus 17 comprises a base or support 20 which may extend the full length of cabin 10 immediately below one of the racks 13 thereof, but it is preferably divided into identical sections 21 which are longitudinally aligned and provide a base extending the length of the cabin. When the conveying apparatus is in operation, base 20 lies in a substantially horizontal plane. Although this base may be fixed, it is preferable to mount it so that it can be shifted or swung from its subsantially horizontal position spaced below rack 13, as shown on the right hand side of FIGURES 1 and 2, to an upper or inclined position against said rack, as shown on the left hand side of these two figures. A transversely curved panel 23 may cover the outer surface of base 20 at each section 21 thereof so that when the base is in its upper position, the panel appears to be part of rack 13.

In the preferred form of the invention, each base section 21 is hingedly mounted on side wall 14 of the aircraft so that it can be swung between its upper and lower positions. In this example, a shaft 26 extends longitudinally of cabin 10 and is supported in any suitable manner, such as by bearing brackets 27 mounted on and projecting inwardly from wall 14. The inner edge of each base section 21 is carried by shaft 26. In this example, a housing 30 is mounted on base section 21 near each end thereof and projects upwardly therefrom. Shaft 26 extends into and through these housings so that the latter are actually swingably mounted on and carried by the shaft. The outer edge of each section 21 is supported in any suitable manner, such as by means of a plurality of cables 33. Each cable 33 is secured at its lower end 34 to a base section and extends upwardly therefrom and is wound on a spring-loaded self-winding reel 35. Cable 33 and reel 35 are such that base section 21 can be swung downwardly only as far as its horizontal position. When the base section is released, reel 35 winds the cable on itself to swing the section to its upper or closed position. The base section can be retained in its lower position by one or more rods 38, each rod being swingably mounted at its lower end 39 on a pin 40 carried by a bracket 41 mounted on base section 21 near its outer edge. Each rod 38 has a finger 42 on its upper end slidable in a slot 43 in a bar 44 mounted on and extending longitudinally of rack 13 near the outer edge thereof, said slot having a notch 45 in its upper edge near an end thereof. When base section 21 is closed or in its upper position, rod 38 lies along side bar 44, and when said section is moved to its lower position, finger 42 slides along slot 43 until the rod is in a vertical position, at which time the finger rests in notch 45. The upward pull of cables 33 keep the finger in notch 45 until some one moves rod 38 back out of the vertical position when it is desired to close the conveying apparatus.

If desired, latches may be provided on adjacent ends of base sections 21 to keep said sections in alignment when the sections are open. For example, a spring-loaded latch 47 mounted on the end of one base section may fit into a keeper 48 on the adjacent end of the next base section when said sections are in their lower or open positions, see FIGURE 4. When it is desired to raise the sections, latch 47 is withdrawn from keeper 48 by means of a knob 49.

Track means 52 extends the length of base 20, and when the latter is in sections 21, the track means is in sections 52, one on each base section. In this example, the track means includes two laterally spaced rows of rollers 53 and 54 mounted on shafts 55 and 56 respectively. Walls 57 and 58 are mounted on and project upwardly from each base section 21 and extend along opposite sides of each track section 52, see FIGURES 5 and 6. One end of each shaft 55 is supported by wall 57, while the opposite end of said shaft is supported by a bracket 59 mounted on and extending upwardly from base section 21 on the opposite side of roller 53 from said wall 57. Similarly, each shaft 56 is supported at one end by wall 58 and at its opposite end by a bracket 60 mounted on and projecting upwardly from base section 21, inwardly of roller 54. Rollers 53 along one side of track means 52 are aligned to form a track extending from end to end of conveying apparatus 17, while rollers 54 are aligned to form another track at the opposite side of track means, see FIGURE 3.

A plurality of trays 63 are provided for apparatus 17. Each tray has a bottom 65 of a width to fit between rollers 53 and 54, see FIGURES 5 and 6. Side walls 66 and 67 extend upwardly from opposite sides of tray bottom 65 and have laterally extending flanges 68 and 69 along upper edges thereof, said flanges extending outwardly over and resting upon rollers 53 and 54 when the tray is positioned in the conveying apparatus. Flanges 68 and 69 co-operate with side walls 66 and 67 to form grooves in the tray bottom for receiving rollers 53 and 54.

Tray 63 rides on rollers 53 and 54, and side walls 66 and 67 of the tray prevent the latter from shifting laterally in the conveying apparatus. Suitable means is provided for releasably preventing the tray from moving upwardly off the rollers. In this example, walls 57 and 58 are formed with inwardly extending flanges 71 and 72 which overlie tongues 74 and 75 which extend laterally from outer edges of side flanges 68 and 69 of the tray. Tongue 74 extends substantially the length of the tray and is resiliently retained in an outer position. In this example, tongue 74 extends into a cavity 77 formed within flange 68, said tongue having a head 79 on its inner edge against which a spring 80 presses. With this arrangement, tongue 74 can be moved inwardly relative to the tray against the pressure of spring 80. Tongue 75 is similar to tongue 74 and is resiliently urged into an outer position by spring 82.

When tray 63 is positioned on rollers 53 and 54, the outer edges of flanges 68 and 69 are spaced a little from wall flanges 71 and 72 so that the tray can be shifted to a limited extent laterally relative to said rollers. Tongues 74 and 75 are normally located below flanges 71 and 72 so that the tray cannot be lifted off the rollers. However, when it is desired to remove the tray from conveying apparatus 17, it can be shifted laterally, for example, in the direction of roller 54, at which time, tongue 75 engages adjacent wall 58 and is moved inwardly relative to tray flange 69. The space between the inner ends of wall flanges 71 and 72 is such that the tray can be moved laterally sufficiently to enable tongue 74 to clear wall flange 71, at which time the edge of the tray can be swung upwardly so that said tray can be withdrawn from the conveying apparatus. This action is reversed when it is desired to place the tray on the conveying apparatus. The edge of the tray containing tongue 75 is moved downwardly and laterally to depress tongue 75 against wall 58 sufficiently to enable tongue 74 to be moved downwardly beneath flange 71.

Suitable power means is provided for moving trays 63 along the conveyor apparatus. This is accomplished by means of endless belts extending longitudinally of apparatus 17. When the apparatus is divided into sections, each section has its own set of driving belts. Although the trays are moved along the conveyor apparatus, the drive must be such that the tray will stop if it runs into the end wall of cabin 10 or into another tray on the conveyor ahead of it.

In this example, each track section 52 has a pair of spaced belts 84 and 85 extending longitudinally thereof located outside rollers 53 and 54, respectively, and having shallow teeth 86 and 87 projecting outwardly from their outer surfaces. Belts 84 and 85 extend around pulleys 90 and 91 respectively at opposite ends thereof and located near opposite ends of each base section 21. If desired, belts 84 and 85 may run over rollers 92 mounted on shafts 55 and 56. One pair of pulleys 90 and 91 are fixedly mounted on a shaft 93 extending across the base section near one end thereof, while the other pair of pulleys 90 and 91 are mounted on another shaft 94 extending across the base at its opposite end. Either or both of the shafts 93 and 94 are rotated in order to move belts 84 and 85 around their respective pulleys. In this example, shaft 93 extends laterally into one of the housings 30, and has a bevel gear 96 fixedly mounted thereon meshing with another bevel gear 97 fixedly mounted on shaft 26 so that rotation of said shaft causes the belts to move around their pulleys. Tray 63 has one or more lugs 100 projecting downwardly therefrom at each side thereof fit into the teeth 86 and 87 of belts 84 and 85 see FIGURE 7. With this arrangement, when tray 63 is placed on rollers 53 and 54 of conveyor 17, lugs 100 thereof fit into the teeth 86 and 87 of belts 84 and 85 so that movement of the belt moves the tray along the conveyor apparatus. Teeth 86 and 87 and lugs 100 provide frictional engagement between the tray and conveyor belts 84 and 85.

Although each tray 63 may be left open, it is desirable to provide a cover therefor and, preferably, removably secured thereto. The cover is needed because of the fact that aircraft often suddenly meet turbulent conditions in the surrounding air which cause the craft to pitch and yaw. The cover is needed to prevent the contents of the tray from being thrown out of it under these conditions.

Tray 63 is provided with a cover 105. This cover needs to be firmly retained on the tray when in position, and yet it must be possible quickly and easily to remove the cover.

FIGURES 8 to 11 illustrate a preferred form of tray 63 and matching cover 105. As mentioned above, the tray has flanges 68 and 69 extending along opposite sides thereof. It also has a front flange 109 extending along one end thereof and a back flange 110 extending across its opposite end, said front and back flanges being in the same plane as side flanges 68 and 69. In this example, cover 105 is removably secured to flange 110 by one or more separable hinges 112. Each hinge includes a pintle 115 secured to flange 110 and extending over a well 116 formed in said flange, see FIGURE 9. The remainder of the hinge comprises a sleeve 118 secured to cover 105 and rotatably mounted on pin 115, said sleeve having a slot 119 therein extending from end to end thereof. This slot is so located in the sleeve that when cover 105 is resting on the tray, the portion 120 of the sleeve is positioned below pin 115 so that the sleeve cannot come off the pin. However, when the cover is swung upwardly into a position substantially at right angles to the tray, sleeve 118 can be lifted off pin 115 thereby allowing the cover to be removed from the tray.

Cover 105 may fit into a groove formed in flanges 68, 69 and 109, or as shown, it may fit within beads 122 and 123 formed on and projecting upwardly from side flanges 68 and 69 respectively. The rim of the cover slidably fits between these two flanges. The front edge 125 of cover 105 fits into a groove 127 formed in front of flange 109, see FIGURE 10. This front edge 125 of the cover is inclined downwardly and outwardly relative to flange 109, and groove 127 is formed with a shoulder 129 which overlaps a portion of the cover rim when the latter is in groove 127, see FIGURE 10. A bead 131 is formed on and projects upwardly from flange 109 at and outwardly of groove 127, said bead having an inclined surface 132 extending towards the groove and acting as a lead-in surface therefor. A handle 134 is formed on the front end of cover 105 immediately above bead 131.

The bottom 65 of tray 63 can be molded to include wells to receive dishes, cups and the like, as shown in FIGURE 11, or a thick sheet of material, such as plastic material, having holes therein for receiving the dishes and cups may be supplied. In this example, tray bottom 65 is molded into a well 138 for receiving a dish 139, and into another well 142 for receiving the bottom portion of a correspondingly-shaped cup 143. In order to prevent liquid from spilling out of cup 143, cover 105 may be molded to form a downwardly-opening recess 146 which is positioned to fit over the top of cup 143. When the cover is pressed into its final closed position, the portion thereof over cup 143 fits against the top of said cup, see FIGURE 11, to seal the latter off.

When cover 105 is placed over tray 63, the hinge or hinges 112 fix the back end of the cover to flange 110. The sides of the cover fit snugly between side beads 68 and 69, while the front edge 125 of the cover is guided into groove 127 by surface 132 of bead 131 when the cover is pressed downwardly relative to the tray. When the cover is in its final position, edge 125 fits beneath shoulder 129 in said groove so that the cover is firmly held in position. At this time, liquid cannot spill out of cup 143 since a portion of the cover is pressed against the upper end of the cup. This same idea may be applied to water or juice glasses or soup or other liquid dishes positioned within the tray.

The above description includes the basic elements for this food conveying apparatus. All or the main portion of apparatus 17 may be located in cabin 10 of the aircraft. In this example, the entire conveyor is in the cabin, and it extends to a bulkhead 155 separating the cabin from the galley area of the craft, said bulkhead having an opening 156 therein at the end of the conveyor large enough to enable trays 63 with their covers to be moved through the opening on to the conveyor. Shaft 26 is rotated by a suitable source of power, such as an electric motor 159 which, in this case, is located in the galley.

When conveyor apparatus 17 is not required, base sections 21 are folded into their upper positions beneath racks 13 where they are out of the way and out of sight, as clearly shown at the left hand side of FIGURES 1 and 2. At this time, each rack and the conveyor associated therewith take up very little if any more room than the standard racks in aircraft. When it is desired to serve a meal in the plane, the stewardess will walk down aisle 12 and swing all of the base sections 21 and the parts associated therewith downwardly into the horizontal position as shown at the right hand of FIGURES 1 and 2. Cables 33 limit the downward movement of these elements, while rods 38 are moved into place to retain the conveyors in the open positions. The latches and locks for retaining base sections 21 in their upper closed positions have been omitted for the sake of clarity.

Trays 63 are made up with the meals thereon in the galley in the customary manner, and after a cover 105 is applied to each tray, the latter is moved through bulkhead opening 156 on to the end of the adjacent conveyor apparatus. At this time, the side flanges 68 and 69 of each tray rest upon rollers 53 and 54 of the conveyor, while lugs 100 of the tray fit into teeth 87 of the endless belts 84 and 85. Motor 159 rotates shaft 26 and this, in turn, rotates transverse shafts 93 of the various track sections 52, thereby moving the tray along the conveyor. As the belts 84 and 85 of the different track sections 52 of the apparatus at each side of the aircraft are aligned, the tray can be moved from one end to the other of the conveyor. If desired, teeth 86 of the conveyor belts 84 and 85 can be made slightly flexible so that if a tray hits the bulkhead at the opposite end of the conveyor from bulkhead 155, the tray can stop while the belts keep moving. The same applies if a tray engages another stationary tray ahead of it. On the other hand, a limit switch, not shown, may be provided at the end of the conveyor so that the conveyor will be stopped if a tray reaches said end.

The stewardess removes the trays from the conveyors and places them before the passengers in the usual way. The passengers can swing cover 105 upwardly on its hinge or hinges 112 so as to be able to gain access to the food on the tray. If turbulent conditions are encountered while the meal is being eaten, the passenger can close the tray with the cover. After the meal has been eaten, motor 159 is reversed, and the stewardess only has to lift the trays away from the passengers and to place them on the conveying means which is now operating in the opposite direction.

What I claim as my invention is:

1. Food conveying apparatus for aircraft comprising track means mounted in an aircraft, a tray constructed to ride on and along and supported by said track means, and releasable retaining means including a first portion connected along said track means and a second portion mounted on the tray, said first and second portions cooperating with each other for retaining the tray on said track means and for preventing said tray from tipping relative to the track means while permitting the tray to travel therealong.

2. Food conveying apparatus as claimed in claim 1 including a cover removably fixed to said tray.

3. Food conveying apparatus as claimed in claim 1 including power means extending along the track means and engageable with said tray to move the latter along the former.

4. Food conveying apparatus for aircraft comprising a support hingedly mounted on a side wall of the cabin of an aircraft and swingable between a lower substantially horizontal position and an upper closed position, conveying means mounted on and extending longitudinally of the support, power means operatively connected to said conveying means, a tray adapted to be placed upon and moved by said conveying means, and releasable and cooperating means extending along the conveying means and on the tray for retaining the latter on the conveying means while permitting the tray to be moved by said conveying means.

5. Food conveying apparatus as claimed in claim 4 in which the conveying means comprises a plurality of rollers throughout said means over which the tray rides, and endless conveyor belts extending longitudinally of the conveying means and frictionally engaging the tray to move the latter over the rollers.

6. Food conveying apparatus as claimed in claim 5 in which said power means comprises a shaft extending alongside the conveying means, and drive means connecting said shaft to the conveyor belts to operate the latter, said support being hingedly mounted along one side thereof on said shaft.

7. Food conveying apparatus as claimed in claim 5 in which the frictional engagement between the tray and the conveying means comprises shallow teeth projecting from the conveyor belts, and at least one lug projecting from the tray and engaging the teeth of each belt.

8. Food conveying apparatus as claimed in claim 1, in which said tray comprising a bottom, a cover over and mounted on said bottom, and locking means releasably interconnecting the tray bottom and the cover.

9. Food conveying apparatus as claimed in claim 8 including means for positioning dish elements on the tray bottom, and an inwardly opening depression in the cover positioned to fit over one of said dish elements, said cover pressing against said one dish element when the cover is connected to the tray bottom.

10. Food conveying apparatus as claimed in claim 8 in which said locking means comprises separable hinge means interconnecting one edge of the cover and the tray bottom, and snap means at an opposite edge of the cover releasably connecting the latter to said bottom.

11. Food conveying apparatus as claimed in claim 10 in which said snap means includes a groove in the tray bottom into which said opposite edge of the cover fits, and a shoulder in said groove lying over a portion of said opposite edge of the cover.

12. Food conveying apparatus for aircraft comprising a support mounted on a fixed portion of a cabin of an aircraft and movable between an out-of-the-way position and a position where it can be reached by a person standing in the cabin, conveying means mounted on and extending longitudinally of the support, power means operatively connected to said conveying means, a tray adapted to be placed upon and moved by said conveying means, and releasable and cooperating means extending along the conveying means and on the tray for retaining the latter on the conveying means while permitting the tray to be moved by said conveying means.

13. Food conveying apparatus as claimed in claim 12 in which the conveying means comprises a plurality of rollers throughout said means over which the tray rides, and endless belt means extending longitudinally of the apparatus adjacent said rollers and positioned frictionally to engage the tray, said power means being connected to said belt means to operate the latter to move the tray over the rollers.

14. Food conveying apparatus for aircraft comprising track means mounted in an aircraft, a tray adapted to ride on and along said track means, said track means comprising a plurality of aligned rollers adapted to fit in grooves in the tray bottom, and cooperating and releasable retaining means along the track means and on the tray for retaining the latter on said track means for preventing said tray from tipping relative to the track means while permitting the tray to travel therealong.

15. Food conveying apparatus for aircraft comprising track means mounted on an aircraft, a tray adapted to ride on and along said track means, said tray comprising a bottom, a cover over and mounted on said bottom, and locking means releasably interconnecting the tray bottom and the cover, and co-operating and releasable retaining means along the track means and on the tray for retaining the latter on said track means for preventing said tray from tipping relative to the track means while permitting the tray to travel therealong, said cooperating and releasable retaining means comprising retractable flanges projecting laterally from opposite sides of the tray bottom, flange means in said track means normally overlying said flanges, and resilient means normally urging said flanges outwardly relative to said bottom and beneath the flange means.

16. Food conveying apparatus for aircraft comprising track means mounted in an aircraft, a tray adapted to ride on and along said track means, and cooperating and releasable retaining means along the track means and on the tray for retaining the latter on said track means and for preventing said tray from tipping relative to the track means while permitting the tray to travel therealong, a power means extending along the track means and engageable with said tray to move the latter along the former, and wherein said track means comprises a plurality of aligned rollers adapted to fit in grooves in the tray bottom, and wherein said power means includes endless belt means extending longitudinally of the apparatus adjacent said rollers, said belt means being positioned frictionally to engage the tray bottom to move the tray over the rollers.

17. Food conveying apparatus as claimed in claim 16 in which said belt means comprises a plurality of endless conveyor belts positioned to engage the tray bottom.

18. Food conveying apparatus for aircraft comprising track means mounted in an aircraft, a tray adapted to ride on and along said track means, and cooperating and releasble retaining means along the track means and on the tray for retaining the latter on said track means and for preventing said tray from tipping relative to the track means while permitting the tray to travel therealong, the last said means comprising side flanges extending along opposite sides of the track means, and resiliently loaded tongues mounted on the tray at the sides thereof and extending outwardly therefrom beneath said side flanges, said tray tongues being retractable to permit the tray to be lifted off the track means.

References Cited
UNITED STATES PATENTS

| | | | |
|---|---|---|---|
| 1,648,531 | 11/1927 | Bayley | 186—1 |
| 3,107,027 | 10/1963 | Hong | 220—23.8 |
| 3,252,563 | 5/1966 | Juengel | 198—160 |
| 3,295,635 | 1/1967 | Cahn | 186—1 |
| 3,295,737 | 1/1967 | Page | 206—72 |
| 3,305,126 | 2/1967 | Cease | 220—23.6 |

RICHARD E. AEGERTER, *Primary Examiner.*

H. C. HORNSBY, *Assistant Examiner.*